UNITED STATES PATENT OFFICE.

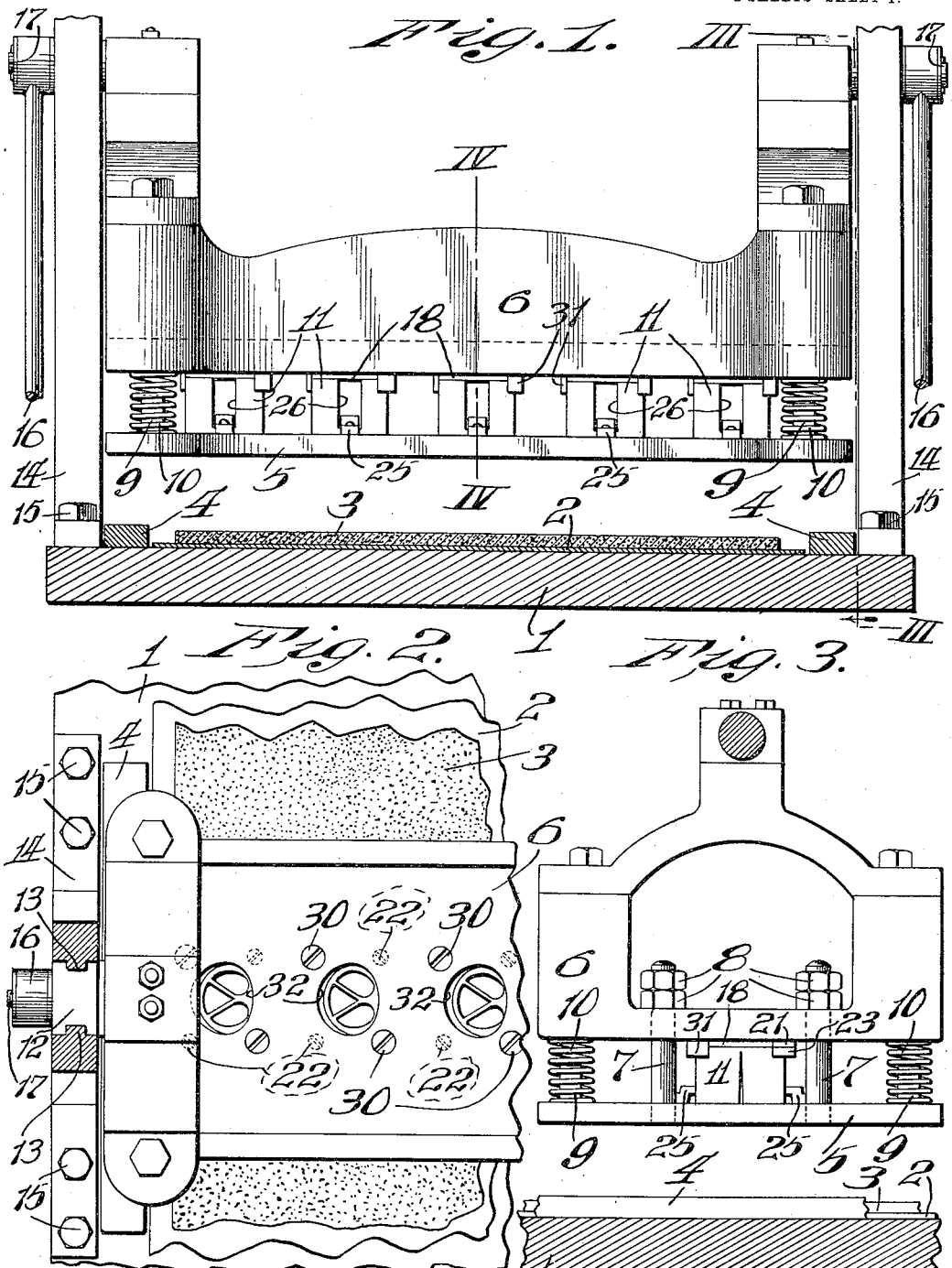

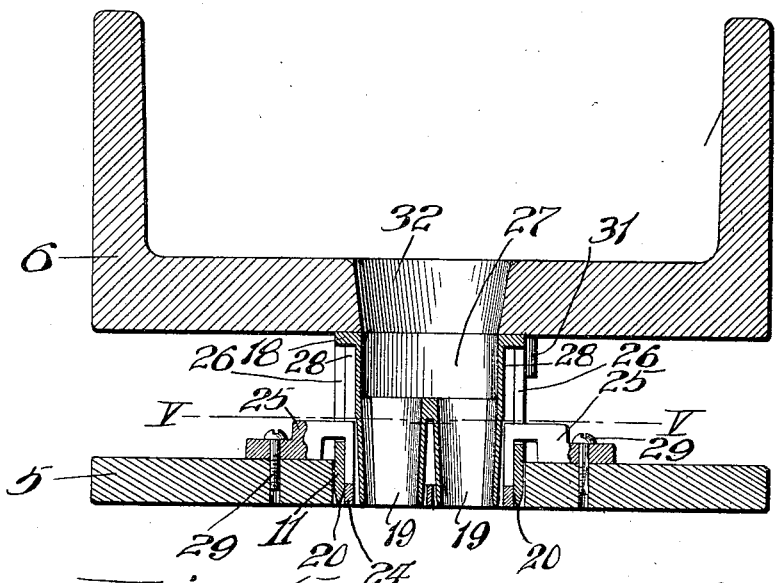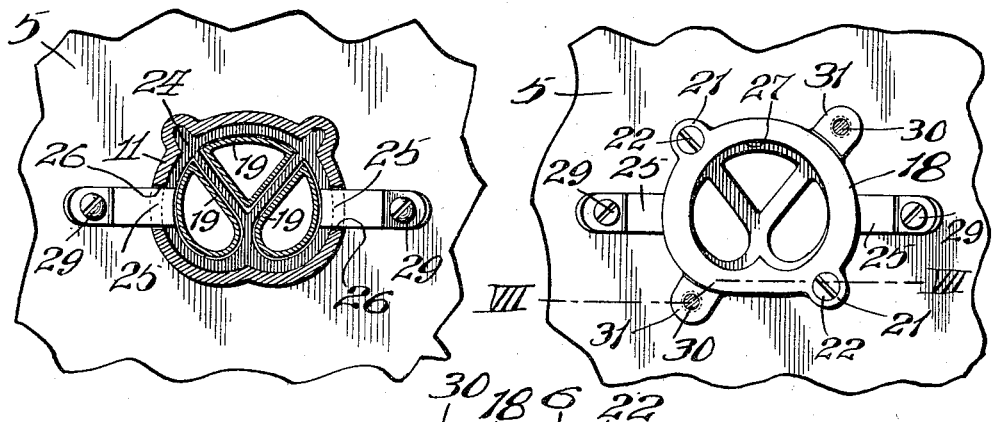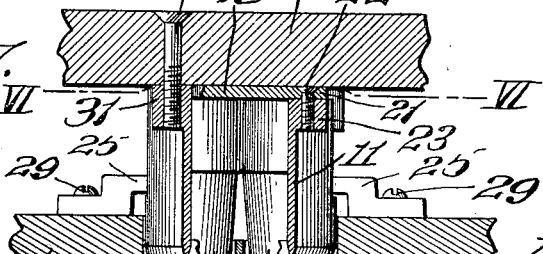

CHARLES F. BETZ, OF ST. LOUIS, MISSOURI.

DOUGH-CUTTING MACHINE.

1,017,374.      Specification of Letters Patent.      Patented Feb. 13, 1912.

Application filed May 3, 1911. Serial No. 624,760.

*To all whom it may concern:*

Be it known that I, CHARLES F. BETZ, a citizen of the United States of America, residing in the city of St. Louis and State of Missouri, have invented certain new and useful Improvements in Dough - Cutting Machines, of which the following is a specification.

This invention relates to dough cutting machines, and has for its primary object to provide an improved construction, combination and arrangement of parts in devices of this character.

One of the objects of the present invention is to provide an improved dough cutting die having passages therethrough for discharging the waste cuttings, the construction of the die being adapted to prevent clogging of said passageways.

Another object is to provide improved means for retaining the dough portions to be baked from displacement until the return movement of the die.

Other and further objects will appear in the specification, and be specifically pointed out in the appended claims, reference being had to the accompanying drawings exemplifying the invention, and in which—

Figure 1 is an end elevation of a dough cutting machine, provided with my improvements, parts being shown in section, and parts being broken away. Fig. 2 is a top or plan view of a portion of Fig. 1, parts being shown in section, and parts broken away. Fig. 3 is a section on line III—III, Fig. 1. Fig. 4 is a section on line IV—IV, Fig. 1. Fig. 5 is a section on line V—V, Fig. 4. Fig. 6 is a section on line VI—VI, Fig. 7. Fig. 7 is a section on line VII—VII, Fig. 6.

Referring more particularly to the drawings, and to the embodiment shown therein, the dough cutting machine embodying my improvements comprises a platen 1 of any suitable material, over which is drawn an endless belt 2, preferably of canvas, upon which a layer 3 of dough is disposed in any suitable manner, said layer being of the desired thickness to form the pretzels or other articles which are to be baked. Adjacent the lateral edges of the platen 1, are a pair of guard rails 4 of suitable thickness to prevent a wiper plate 5 from coming in contact with the dough layer 3 during the cutting operation. Said wiper plate, as shown in Fig. 3, is suspended from the cutter head 6 by means of sliding bolts 7 which are threaded at their lower ends in the wiper plate 5 and slide through apertures in the bottom plate of the cutter head 6. The upper ends of the sliding bolts 7 are provided with lock nuts 8 which limit their downward displacement when the cutter head is raised. At each end of the wiper plate 5, and adjacent its lateral edges, are provided a pair of spring retaining pins 9 for retaining a pair of springs 10 in position; said springs being disposed between the bottom plate of the cutter head 6 and the wiper plate 5 to force said wiper plate into its lowered position when the cutter head is raised, a movement which adapts it to wipe the dough from the cutting edges of the die.

Mounted upon the cutter head, and movable therewith relative to the wiper plate 5, are the outer shells 11 of a plurality of dough cutting dies, the detail construction of which will be hereinafter described.

In order to impart a vertical reciprocatory movement to the cutter head, a cross head slide 12 is provided on either side of the machine, said cross head being slidably mounted in guides 13 provided in the standard 14, which is secured to the platen 1 by means of bolts 15. A pair of connecting links 16, each being connected above with a journal pin 17 integral with the cross head 12, serves to transmit a reciprocatory movement to the cutter head.

Referring now more especially to Figs. 4, 5, 6 and 7, each of the dough cutting dies is constructed in two parts, namely, an inner portion comprising, in the present embodiment, a substantially heart-shaped top flange 18, from which depends three tubular cutting knives 19, and an outer shell or housing 11, whose lower extremities are provided with cutting edges 20 in the same plane as the cutting edges on the lower extremities of the inner portion of the die. In order to secure the inner and outer portions together to the top flange 18, said inner portion is provided with a pair of ears 21 through which screws 22 are passed into threaded lugs 23, provided at the top of the outer shell 11. Reciprocable within the outer shell, and between the walls thereof and the depending tubular knives 19, is a follower or presser foot 24 of substantially the same shape that is to be imparted to the cut dough. Said follower is provided with a pair of laterally projecting arms 25 which are offset upwardly to provide recesses for the lower portion of the outer shell 11; said outer shell being provided in its lateral walls with a pair of oppositely disposed slots 26, within which the arms 25 slide when the cutter head is reciprocated. The upper portion of the inner member of the die is provided with a cup-like cavity 27 into which the passageways through the tubular knives 19 discharge the dough scraps. On the outer wall of this portion of the inner member is provided a pair of recesses 28 for the reception of the arms 25 when the cutter head is in lowered position. As shown in Fig. 4, the recesses 26 and 28 are in registration. The outer ends of the arms 25 are secured to the wiper plate 5 by means of screws 29 so that said presser foot is held against relative movement to said wiper plate 5, and serves to retain the dough pretzel, or other article, upon the canvas belt 2 until the cutting dies have been raised out of contact therewith, after which said presser foot is retracted in turn by the continued upward movement of the cutter head. Each of the cutting dies is secured to the bottom plate of the cutter head 6 by means of screws 30 which pass downwardly through said bottom plate on threaded end lugs 31 projecting from the outer shell 11. The bottom plate of the cutter head 6 is provided with an upwardly enlarged opening 32 which registers with the cup-like receptacle 27 in the upper end of the inner die portion.

The operation of this embodiment of my invention will now be readily understood, and briefly stated, is as follows: The layer 3 of dough having been fed under the wiper plate 5, the cutter head descends until the guard rails 4 press the wiper plate upwardly, and the cutting edges of the dies are caused to enter the dough layer. At the same time, the presser foot is retracted upwardly to provide space for the cut dough. As the cutting operations go on, the accumulation of waste dough cuttings are forced upwardly through the tubular knives 19, and by reason of these passageways being enlarged upwardly, there is no clogging. To facilitate the ready removal of the cuttings, and to still further relieve any congestion which might occur, the cup-like receptacle 27 provides still further relief, and is moreover open from above through the upwardly enlarged opening 32 in the bottom plate of the cutter head. As shown best in Fig. 6, the inner walls of the tubular knives 19 are spaced away from the inner walls of the receptacle 27, thus leaving an annular space around the cuttings as they are forced upwardly through the passageways, and making it easy to retract the cuttings.

What I claim is:

1. In a dough cutting machine, the combination with a cutter head, of an outer tubular cutter depending therefrom, said cutter being provided with slots extending through the walls thereof, an inner tubular cutter spaced from the outer cutter, and a follower fitting the space between said cutters; said follower being provided with laterally projecting arms reciprocably mounted within said slots.

2. In a dough cutter, a cutting die provided with a plurality of tubular knives, the passageways therethrough being enlarged away from the cutting edges, and a common receptacle into which said passageways discharge, the lateral walls of said receptacle being disposed outwardly beyond the lateral walls of said passageways.

3. In a dough cutter, the combination with a reciprocable cutter head, of a cutting die carried thereby and comprising an outer shell secured to said cutter head, and an inner portion nested within the outer shell and having tubular cutters with outwardly enlarged passageways leading therethrough, and a receptacle common to all of said passageways, the bottom plate of said cutter head being provided with an opening therethrough in register with said receptacle and enlarged upwardly.

4. In a dough cutter, the combination with a cutting die comprising an outer shell open at the top and provided with oppositely disposed slots extending to the top of said shell, and an inner tubular cutter nested within said shell and provided with a flange closing the upper end thereof, and a follower fitting into and closing the space between said die portions, said follower being provided with laterally projecting arms reciprocable within said slots.

5. In a dough cutter, the combination with a cutter head, of inner and outer tubular cutters depending therefrom, a wiper plate resiliently suspended from said cutter head; said plate being provided with apertures conforming to said outer cutter, and a follower reciprocably mounted in the space between said cutters; said follower being rigidly secured to said wiper plate.

6. In a dough cutter, the combination with a reciprocable cutter head, of a die depending therefrom and comprising an inner tubular cutter having an upwardly enlarged passageway therethrough, and a receptacle larger than said passageway above; said tubular die being provided with a flange, an outer shell surrounding the inner portion and spaced therefrom to form the desired cutting edges of the die; said outer shell being provided with lugs whereby it may be secured to said cutter head and clamp the flange of said inner tubular cutter to said cutter head.

CHARLES F. BETZ.

In the presence of—
M. A. HALDEMAN,
M. C. HAMMON.